US012600871B2

(12) United States Patent
Vacca et al.

(10) Patent No.: US 12,600,871 B2
(45) Date of Patent: Apr. 14, 2026

(54) DYE-EXCHANGED ZEOLITE MARKER

(71) Applicant: SAES GETTERS S.P.A., Lainate (IT)

(72) Inventors: Paolo Vacca, Milan (IT); Stefano Zilio, Bareggio (IT); Anna Nuzzo, Maddaloni (IT); Katarzyna Fidecka, Cantù (IT); Agnello De Simone, Saronno (IT)

(73) Assignee: SAES GETTERS S.P.A., Lainate (IT)

( * ) Notice: Subject to any disclaimer, the term of this patent is extended or adjusted under 35 U.S.C. 154(b) by 8 days.

(21) Appl. No.: 18/701,412

(22) PCT Filed: Jul. 28, 2023

(86) PCT No.: PCT/EP2023/071081
§ 371 (c)(1),
(2) Date: Apr. 15, 2024

(87) PCT Pub. No.: WO2024/023341
PCT Pub. Date: Feb. 1, 2024

(65) Prior Publication Data
US 2025/0257229 A1 Aug. 14, 2025

(30) Foreign Application Priority Data
Jul. 29, 2022 (IT) ........................ 102022000016188

(51) Int. Cl.
*C08K 9/12* (2006.01)
*C09B 69/06* (2006.01)
(Continued)

(52) U.S. Cl.
CPC ................. *C09D 7/62* (2018.01); *C08K 9/12* (2013.01); *C09B 69/06* (2013.01); *C09D 7/68* (2018.01);
(Continued)

(58) Field of Classification Search
CPC ... C09D 7/62; C09D 7/69; C09D 7/68; C08K 9/12; C08K 2201/005; C08K 3/34;
(Continued)

(56) References Cited

U.S. PATENT DOCUMENTS

2023/0046062 A1* 2/2023 Dutta ...................... A61L 15/44

FOREIGN PATENT DOCUMENTS

CN 114574070 A * 6/2022 ............... C09D 5/22
DE 10048875 A1 * 4/2002 ............... C11D 3/40
(Continued)

OTHER PUBLICATIONS

International Search Report and Written Opinion issued Nov. 2, 2023 in PCT/EP2023/071081, 15 pages.
(Continued)

*Primary Examiner* — Shuangyi Abu Ali
(74) *Attorney, Agent, or Firm* — Element IP, PLC

(57) ABSTRACT
A dye-exchanged zeolite marker wherein the zeolite is characterized by a pores size comprised between 4 Å and 12 Å and the dye is an organic cationic molecule, characterized by an amount of dye comprised between 0.05% wt and 1% wt with respect to the zeolite weight, optically active compositions comprising the same dispersed in a polymeric matrix and their use as a detectable marker.

12 Claims, 1 Drawing Sheet

Organic mass trend during process simulation for samples C2 and S2

(51) Int. Cl.

| | |
|---|---|
| *C09D 5/22* | (2006.01) |
| *C09D 7/40* | (2018.01) |
| *C09D 7/62* | (2018.01) |
| *C09K 11/02* | (2006.01) |
| *C09K 11/06* | (2006.01) |

(52) U.S. Cl.
CPC .......... *C09D 7/69* (2018.01); *C08K 2201/005* (2013.01)

(58) Field of Classification Search
CPC .......... C08K 5/0041; C08K 5/29; C08K 9/04; C08K 9/06; C08K 3/013; C09B 69/06; C03B 23/0235; C03B 29/08; C03B 35/202; C01B 39/026
See application file for complete search history.

(56) References Cited

FOREIGN PATENT DOCUMENTS

| | | |
|---|---|---|
| EP | 0802861 B1 | 4/2002 |
| WO | WO-2021113377 A1 | 6/2021 |

OTHER PUBLICATIONS

Yanan Zhang et al, "Utilization of NaP zeolite synthesized with different silicon species and NaAlO2 from coal fly ash for the adsorption of Rhodamine B", Journal of Hazardous Materials, 415, 125627, 2021, pp. 1-14.

* cited by examiner

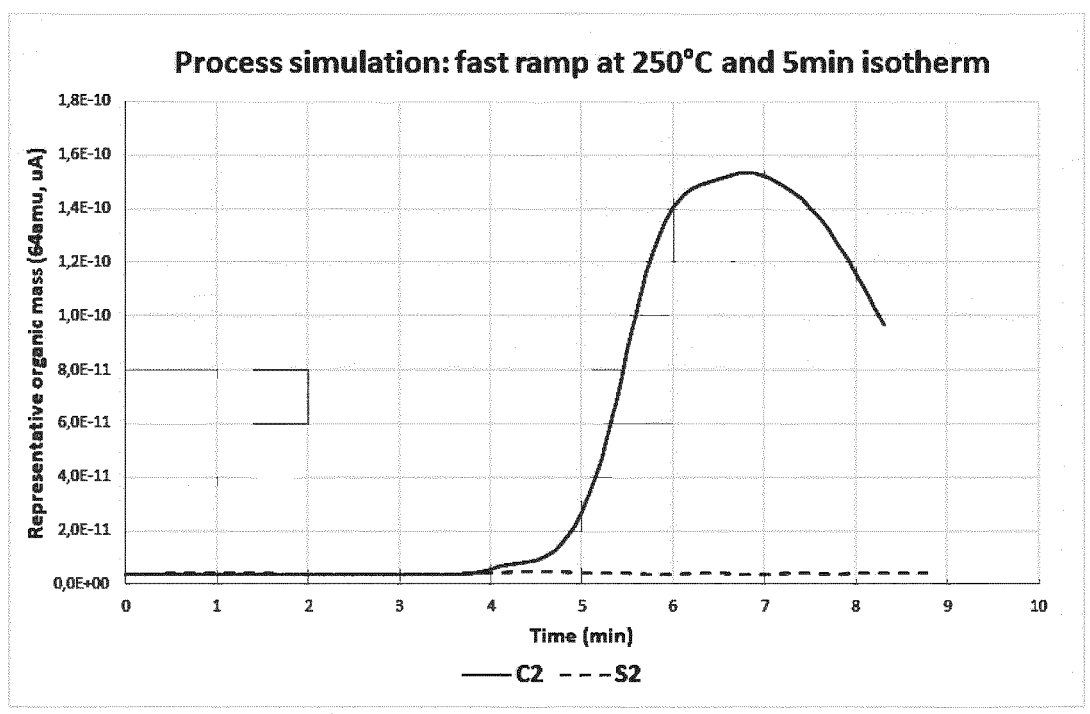
Organic mass trend during process simulation for samples C2 and S2

DYE-EXCHANGED ZEOLITE MARKER

BACKGROUND

The present invention relates to a dye-exchanged zeolite marker and an optically active composition comprising said marker dispersed in a polymeric matrix.

Numerous patent publications, e.g., EP1409997, EP1356478, WO2011045572, WO2021113377, or US20100003762, concern the preparation of marking materials for a wide range of possible applications, such as for anti-counterfeiting aim, for stock control or warranty purposes, for detecting the presence of a specific substance in a particular medium or as packaging solution. A well-known means of detecting specific substances is represented by the use of colorimetric indicators which rely on the optical properties of reactive dyes or inks under particular conditions. Particularly, these dyes can exist in at least two different chemical states, with each form of the dye absorbing light in a particular range of wavelength. When such a reactive dye existing in a first form is exposed to a given substance, it reacts with the substance via a reversible chemical reaction, thereby turning into a second form of the dye. As the second form of the dye absorbs light at a different wavelength, the chemical reaction provides a visible—and thus detectable—color change.

The integration of said molecules in desired substrates, which also comprises the possibility to use zeolites, is typically realized through impregnating methods, as disclosed in WO2011045572, or with post-treating methods as reported in U.S. Pat. No. 11,027,241. Also, CN110903826 disclosed the use of fluorescent molecules such as Rhodamine integrated on the surface of a Metal-Organic Frameworks (MOF) type structure with a diffusive impregnating technique. While WO2021113377 describes antimicrobial zeolites nanoparticles which, in addition to the metallic species, can further comprise an optical tracer (e.g., a fluorophore) non-covalently or covalently bonded to the surface of the zeolites but not within the pores of the nanoparticles.

The main drawback of such approach is related to the limited stability of the final system which, when exposed to heating treatment, such as under extrusion processing in the case of thermoplastic matrices, or in presence of water or other solvents, tends to easily release the dye molecules to be decomposed.

A further possible approach is based on the use of pigments, as reported in WO2005052069, wherein a pigment composition is realized through a substitution reaction with one or more cationic dye groups in the presence of a suspension of a zeolite pigment. However, one of the negative outcomes of the use of both organic and inorganic pigments as disclosed in WO2005052069, is related to the large amount of dye with respect to the zeolite amount, and the consequent high value of the dye/zeolite ratio, required to obtain the coloring purpose.

Therefore, there is still a need to develop novel chemical indicators, and in particular markers, to provide simple, reliable, and cost-effective detection means that exhibit improved stability with respect to those known in the art, particularly when thermally threated or put into contact with solvents. Also, there is a need to develop novel optically active compositions incorporating such markers, which compositions may be prepared and processed via known polymer processing techniques while maintaining the efficacy and stability of the novel indicators.

SUMMARY OF THE INVENTION

The present invention overcomes the aforementioned drawbacks of the prior art by realizing a dye-exchanged zeolite marker prepared with a cation exchange reaction between the positive ion of the zeolite and the one of the dye organic molecule.

In the context of the present disclosure, the wording "dye-exchanged zeolite marker" should be construed as generally known in the art, and in particular as meaning a marker or indicator based on zeolite and obtainable by cation exchange reaction between a cationic dye and a zeolite. The short form "marker" is used interchangeably with "dye-exchanged zeolite marker".

More particularly, with the aim of providing a marker specie able to overcome the prior art problems related to the low stability disclosed above, the inventors of the present invention surprisingly found that when a cation exchange reaction take place between the dye and the zeolite, the dye is more efficiently bonded to zeolites, particularly into the zeolite pores, and consequently not released or decomposed when put in contact with the solvents or high temperature conditions i.e. is more stable with respect to those know in the art.

Therefore, the present invention refers to a dye-exchanged zeolite marker comprising a zeolite, and a dye organic molecule, said marker being obtainable via a cation exchange reaction between at least one positive ion of the zeolite and at least one positive ion of the dye organic molecule.

Moreover, it has been proved that by using a reduced amount of dye molecule with respect to the zeolite, the detectable properties of the obtained marker can still be measured, without modifying the surface characteristics of the zeolite and its compliance to different applications. Thus, the present invention also refers to a dye-exchanged zeolite marker comprising a zeolite and a dye organic molecule, wherein advantageously the weight ratio between the dye and zeolite is comprised between 0.05% wt and 1% wt, preferably between 0.1% wt and 0.5% wt, with respect to the zeolite weight. In other words, contrary to what is disclosed in the prior art, the marker of the present invention does not require a high value of the dye/zeolite ratio to obtain the coloring purpose.

As will be apparent from the experimental part of this disclosure, the measure of the zeolites pores can have a critical role in the preparation of the dye-exchanged zeolite marker of the invention, at least in terms of process yield. Zeolites dye-exchanged zeolite with a pores size comprised between 4 Å and 12 Å have been found particularly advantageous.

The present invention also refers to optically active compositions comprising the dye-exchanged zeolite marker herein disclosed and a polymeric matrix, preferably wherein the marker is dispersed within said polymeric matrix.

In addition, the invention refers to the use of the dye-exchanged zeolite or of the compositions herein disclosed as a detectable marker as well as to detectable items, comprising, embedding or coated with (at least in part) the dye-exchanged zeolite or the compositions according to the invention.

BRIEF DESCRIPTION OF THE DRAWINGS

FIG. 1: is a graph representing a thermogravimetric analysis combined to mass spectroscopy (TG-MS) to evaluate the organic vapour evolution during process simulation for samples C2 and S2. During a ramp at 250° C., for sample C2 the evolution of some organic masses due to decomposition onset were clearly identified, while for sample S2 the absence of any evolution of organic masses (always at zero level) confirmed that no decomposition process was induced in this sample due to the stability of dye-zeolites bond.

DETAILED DESCRIPTION OF THE INVENTION

As anticipated above, the inventors of the present invention, after extensive experimentation, found that dye-exchanged zeolite markers obtained via cation exchange reaction between zeolite and a dye are more stable than the other markers based on zeolites already known in the art where the dye is merely adsorbed onto the zeolite.

Therefore, the present invention refers to a dye-exchanged zeolite marker comprising a zeolite and an organic cationic dye, said marker being obtainable via a cation exchange reaction between at least one positive ion of the zeolite and at least one positive ion of the organic cationic dye.

As will be apparent from the experimental part of the disclosure, the inventors found particularly advantageous zeolites having a pore size comprised between 4 Å and 12 Å in that they allow the dye to be more efficiently bonded to zeolites as well as for better process yield. The surface area and porosity analysis were performed using a Micromeritics BET instrument. Prior to analysis, samples were preconditioned by degassing at 180° C. in turbo vacuum, which allowed to remove physically bonded impurities from the analyzed material. Then the analysis was continued using $CO_2$ for LTA (at −20° C.) or Ar for other zeolites (at −186° C.). The micropore surface area was calculated using the Dubinin Astakhov model, while the pore size using the Saito Foley or the NLDFT models.

Another important feature of the marker obtainable according to the present invention is that it allows for an effective detection despite the rather low value of the dye/zeolite weight ratio (see samples S1-S4, Table 1). Surprisingly, even with a weight ratio between the dye and zeolite comprised between 0.05% wt and 1% wt, preferably between 0.1% and 0.5% wt (extremes included) with respect to the zeolite weight, the marker still allows for an effective detection without modifying the surface characteristics of the zeolite.

The present invention therefore relates to a dye-exchanged zeolite marker comprising a zeolite and a dye, wherein:
- the zeolite is characterized by a pores size comprised between 4 Å and 12 Å.
- the dye is an organic cationic molecule, and
- the amount of the dye is comprised between 0.05% wt and 1% wt with respect to the zeolite weight.

Zeolites suitable for the purpose of the present invention are zeolites generally known in the art provided that they have a pore size comprised between 4 Å and 12 Å. Preferably, the zeolite is a Faujasite type zeolite (FAU) or a Mordenite zeolite (MOR).

The dye is a colorimetric dye as generally known in the art, preferably an organic cationic dye. Preferably, the dye is Rhodamine or a derivative thereof, more preferably the dye is selected in a group consisting of Rhodamine B, tetramethyl rhodamine isothiocyanate—Dextran, Rhodamine 6G, Rhodamine B isothiocyanate, Rhodamine 19 perchlorate, and other Rhodamine derivatives.

According to any embodiment of the present invention, said zeolite is in the form of powder with an average particle size characterized by a $X_{90}$ value—where $X_{90}$ indicates the spherical diameter at which 90% of the particles in the sample are comprised in the given range on a volume basis, comprised between 0.5 and 50 μm—preferably between 0.5 and 20 μm.

Since the dye is efficiently bonded to the inner part of the zeolite, one of the further advantages related to the said marker is related to the possibility to exploit the zeolite surface for further functionalization and activation.

Indeed, in a preferred embodiment of the present invention, the zeolite surface of the marker is modified with alkoxysilane such as, for example, (3-aminopropyl) trimethoxysilane, (3-aminopropyl) triethoxysilane, N-trimethoxysilylpropyl-N,N,N-trimethylammonium chloride, octadecyldimethyl (3-trimethoxysilylpropyl) ammonium chloride, tetradecyldimethyl(3-trimethoxysilylpropyl) ammonium chloride, n,n-didecyl-N-methyl-N-(3-trimethoxysilylpropyl)ammonium chloride, s-(trimethoxysilylpropryl) isothiouronium chloride, 3-(Trihydroxysilyl) propyldimethyloctadecyl ammonium chloride, silsesquioxanes 3-(dimethyloctadecylammonio)propyl, hydroxy-terminated, chloride, and (3-Glycidoxypropyl) trimethoxysilane. The modification is performed with alkoxysilanes through hydrolysis and condensation. Preferably the alkoxysilane derivatives or alkoxysilane moiety is present in an amount comprised between 1 and 40% wt with respect to the zeolite weight. The silane moiety can be then exploited for its intrinsic properties or as a linker for further reactions or polymerization steps.

The dye-exchanged zeolite marker according to any of the embodiment herein disclosed, can also be dispersed in a polymer matrix in order to obtain an optically active composition.

Therefore, the present invention also refers to a composition comprising the dye-exchanged zeolite marker according to any of the embodiments herein disclosed and a polymer or polymer matrix. Said polymeric matrix should be characterized by no excitation and emission features (peak and/or more complex spectral features as a generalized increasing of absorption and/or emission) at a level that can perturb marker's excitation or emission. In detail, since the dye excitation and emission peaks for Rhodamine or Rhodamine derivatives are respectively centered at 560 nm and 580 nm and by considering buffer spectral region identified in ±100 nm, suitable polymer matrices are characterized by no excitation and emission features in a range comprised between 460 and 680 nm.

In a preferred embodiment, the polymeric matrix is selected in a group consisting of polyethylene (PE), polypropylene (PP), polystyrene (PS), polyethylene terephthalate (PET), Acrylonitrile butadiene styrene (ABS) and their copolymers and functionalized polymers, acrylics, acrylics-styrene, vinyl and alkyl copolymer, urethane-acrylics, aliphatic-urethanes, urethanes, polyurethanes, epoxies, siloxanes and polysiloxanes, phenolic resin, poly[ethene-co-(vinyl alcohol)] (EVOH), poly(vinyl alcohol) (PVAL), poly(lactic-co-glycolic acid) (PLGA), polyethylene glycol (PEG), poly(vinyl acetate) (PVAC), waterborne or water reducible latex, polylactic acid (PLA), aliphatic/aromatic co-polyesters, preferablypolybutylene adipate terephthalate (PBAT) and poly(butylene sebacate-co-terephthalate) (PBSeT), poly(butylene succinate-co-butylene terephthalate) (PBST), aliphatic co-polyesters from 1,4 Butandiol and carboxylic acid preferably poly (butylene succinate) (PBS) and polybutylene succinate adipate (PBSA), polyhydroxyalcanoates (PHAs), preferably polyhydroxybutyrate (PHB), poly(hydroxy butyrate-co-hydroxyvalerate) (PHBV), poly-hydroxy butyrate-hexanoate (PHBH), natural polymers, in particular polysaccharide polymers such as chitosan, sodium alginate and starch or modified starch, mixtures thereof. Preferred examples of polymer blends are: a blend of polylactic acid (PLA) and polyhydroxybutyrate/polyhy-droxyvalerate (PHBV) or a blend of polyvinyl alcohol (PVOH) and hydroxypropylated starch ether (STARCH).

In the obtained active composition, the dye-exchanged zeolite marker is preferably present in an amount comprised between 0.1 and 10% by weight with respect to the weight of the polymeric matrix.

In a further embodiment, one or more additional compo-nents, such as fillers, are added to said composition, pref-erably in an amount comprised between 0.1 and 20% by weight with respect to the polymeric matrix. Said additional components can be selected, for example, in a group con-sisting of hydrotalcites, zirconium phosphate, porphyrins, graphene and other two-dimensional crystals, zeolites, hal-loysites, graphene oxide, metal organic frameworks (MOFs), organic beads, cellulose and antioxidant capsules, self-assembled proteins, ester terminated polyamide, tertiary amide terminated polyamide, polyether polyamide, polyal-kyleneoxy terminated polyamide, and mixtures thereof.

As will be apparent from the following non-limiting examples, the dye-exchanged zeolites of the present inven-tion, as well as the polymeric compositions comprising them, proved to have an effective optical activity.

Therefore, the invention also refers to the use of said dye-exchanged zeolites or polymeric compositions compris-ing them as a detectable marker.

As will be apparent for a person skilled in the art, the dye-exchanged zeolites or polymeric compositions of the present invention, can be embedded or coated onto an item, for example a packaging, a fabric, a generic plastic item etc. thereby rendering the item itself, or at least a part thereof, detectable.

Several methods can be used for the preparation of polymer/zeolites composites, e.g., in situ polymerization, polymer dissolution and mixing, extrusion, melt-blending, or other molding processes (e.g. injection, transfer, com-pression, foam, thermoforming, film blowing).

As will be apparent form the following experimental part, the present invention also refers to a method for the prepa-ration of polymeric compositions comprising the dye-ex-changed zeolite marker according to any of the embodi-ments herein disclosed via in situ polymerization, polymer dissolution and mixing, or melt-blending as well as to the compositions obtainable therewith.

Experimental Part

Hereinafter, the invention will be explained in more detail with reference to the following non-limiting examples. Modifications or variations of the embodiments here exem-plified, obvious to an expert in the art, are encompassed by the appended claims.

Preparation of Rhodamine-Exchanged Zeolite Markers (Samples S1-S6 and Counterexample C1)

An amount of rhodamine B (RhB) or RhB-dextran (both from Sigma Aldrich) comprised between 0.05 and 1.25 g was dissolved in 100 mL of distilled water. Then 5 g of zeolite were added to the mixture and pH of the mixture was adjusted to 6 using a HCl (1M) solution. The mixture was stirred using laboratory magnetic stirrer at RT for 24 hours, being protected from light. The obtained complex was then purified via filtration. Purification included extensive wash-ing of the powder with distilled water, until the collected filtrate appeared completely transparent. The obtained rho-damine-exchanged complex was dried overnight in the oven at 80° C.

TABLE 1

| Ref. | Zeolite | SiO$_2$/Al$_2$O$_3$ Ratio | Pore Size (Å) | m RhB (g) | RhB % wt initial content | RhB % wt content obtained from exchanging reaction | Process yield |
|---|---|---|---|---|---|---|---|
| S1 | FAU-Y 5.1 | 5.1 | 7.4 | 0.05 | 1.00 | 0.10 | 10% |
| S2 | FAU-Y 5.1 | 5.1 | 7.4 | 0.25 | 4.76 | 0.24 | ~5% |
| S3 | FAU-Y 5.1 | 5.1 | 7.4 | 0.50 | 9.09 | 0.50 | ~5% |
| S4 | FAU-Y 5.1 | 5.1 | 7.4 | 1.25 | 20 | 0.45 | ~2% |
| S5 | MOR-13 | 13 | 6.5 | 0.125 | 2.5 | 0.63 | ~25% |
| C1 | LTA | 2 | 4.2 | 0.25 | 4.76 | 0.02% | ~0.4% |

Therefore, the present invention also refers to an item or article, preferably selected among a packaging, a fabric, a garment, a device, such as a medical device, an optical tag, a marking component, an anti-counterfeiting element, at least in part comprising, embedding, or coated with, the dye-exchanged zeolites or polymeric compositions accord-ing to any one of the embodiments herein disclosed.

In the light of the above, the compositions comprising the dye-exchanged zeolites, according to any embodiment of the present invention, can be processed in the form of a coating, a film, a lacquer, a frame, a three-dimensional element, a pellet or a sheet or generally in any other form suitable for the intended purpose.

The marker can be used as such or included in a polymeric matrix as disclosed above to obtain an optically active composition.

Ion exchange reaction with 0.25 g of RhB and LTA zeolite (C1) leads to a very low Rhodamine B content in the LTA zeolite (0.02% wt), making this sample not suitable for the use as a marker.

Preparation of Counterexample C2

An amount of rhodamine B (RhB) of 0.25 g was mechani-cally mixed with 5 g of zeolite ensuring an efficient disper-sion of different materials in powder form. Obtained mixture was dried overnight in the oven at 80° C.

Preparation of Counterexample C3

An amount of 9-(Diethylamino)-5H-benzo[a]phenoxazin-5-one (alternative marker NR) of 0.25 g was dissolved in 100 mL of Dimethyl sulfoxide. Then 5 g of zeolite were added to the mixture. The mixture was stirred using labo-ratory magnetic stirrer at RT for 24 hours, being protected from light. Obtained complex was then purified via filtration. Purification included extensive washing of the powder with distilled water, until the collected filtrate appeared completely transparent. Obtained exchanged complex was dried overnight in the oven at 80° C.

Preparation of Counterexample C4

An amount of Fluorescein 5(6)-isothiocyanate (alternative marker FITC) of 0.25 g was dissolved in 100 mL of distilled water. Then 5 g of zeolite were added to the mixture. The mixture was stirred using laboratory magnetic stirrer at RT for 24 hours, being protected from light. The obtained complex was then purified via filtration. Purification included extensive washing of the powder with distilled water, until the collected filtrate appeared completely transparent. The obtained exchanged complex was dried overnight in the oven at 80° C.

Preparation of Counterexample C5

3-Aminopropyl) triethoxysilane-rhodamine. (APTES-RhB) molecule was prepared prior to its attachment to the zeolite surface. For its synthesis, the protocol described in T. Nedelcev et al./*Dyes and Pigments* 76 (2008) 550e556 was followed. Briefly, rhodamine B (0.002 mol, 0.96 g) was dissolved in chloroform (30 ml). The solution was stirred and heated to the boiling point of chloroform (61.2° C.). APTES (from ABCR) (0.002 mol, 0.465 ml) was then added dropwise to the rhodamine B solution under stirring. The reaction was stopped after 30 min, then the chloroform was removed from the reaction mixture using rotavapor. Remaining substance (silanized rhodamine, app. 1.3 g) was dried in the oven at 60° C.

Releasing Tests on Samples S1-S6 and Counterexamples C1-C4

In order to verify that in dye-exchanged zeolite marker the dye is efficiently bonded to zeolites and consequently not released when put in contact with the solvents or subjected to higher temperature, marker dispersions can be directly investigated. An amount of 22.4 mg of selected samples (S1-S6) or counterexamples (C1-C4) were dispersed in 20 g of solvent. Sample was stirred vigorously at room temperature (RT) and let to settle down for the following 24 hours. As follows, the supernatant was analyzed on its appearance via simple naked-eye observation and compared to a reference colored sample (R1) obtained by dissolving 1.12 mg (2,34E-06 mol) of RhB powder in 20 g of solvent. A list of adopted solvents includes distillated water, acetone, dimethyl sulfoxide, tetrahydrofuran, chloroform, and dichloromethane (DCM). For all adopted solvents, a full transparent dispersion confirmed the absence of released dye as reported in Table 2.

As additional test, the prepared dispersion of the sample was stirred vigorously under heating at 50° C. for 10 min and let to settle down for the following 24 h. As follows, also in this case, the supernatant of the sample was analyzed on its appearance via simple naked-eye observation and compared to a reference colored dye sample. A full transparent dispersion confirmed the absence of released dye and the absence of spectrophotometric signals referable to the dye, confirmed the absence of its releasing. As reported in Table 2, the stability results observed for the room temperature samples were confirmed after the heating treatment.

The dispersions prepared as reported above, was further analyze through UV-Vis spectrophotometry. A calibration curve was defined for each solvent and a detection limit (DL) of 1 ppm was determined. The influence of some parameters such as solvents characteristics, temperature and stirring time was investigated. The results are reported in Table 3 and, where no absorption peak has been detected, a limit of detection has been determined for each solvent and the relative error calculated was 15%.

TABLE 2

| | | Solvents | | | | | |
| | | | | | | Chloro- | |
| Ref. | Sample | H₂O | acetone | DMSO | THF | form | DCM |
| --- | --- | --- | --- | --- | --- | --- | --- |
| R1 | RhB_control | ✓ | ✓ | ✓ | ✓ | ✓ | ✓ |
| S1 | RhB-exchanged FAUY 5.1 zeolites, (0.1% wt RhB content) | ✗ | ✗ | ✗ | ✗ | ✗ | ✗ |
| S2 | RhB-exchanged FAUY 5.1 zeolites, (0.24% wt RhB content) | ✗ | ✗ | ✗ | ✗ | ✗ | ✗ |
| S3 | RhB-exchanged FAUY 5.1 zeolites (0.5% wt RhB content) | ✗ | ✗ | ✗ | ✗ | ✗ | ✗ |
| S4 | RhB-exchanged FAUY 5.1 zeolites (0.45% wt RhB content) | ✗ | ✗ | ✗ | ✗ | ✗ | ✗ |
| S5 | RhB-exchanged MOR 13 zeolites (0.63% wt RhB content) | ✗ | ✗ | ✗ | ✗ | ✗ | ✗ |
| S6 | RhB-exchanged FAUY S.1 zeolites with SAES antimicrobial silane (0.2-0.5% wt RhB content) | ✗ | ✗ | ✗ | ✗ | ✗ | ✗ |
| C1 | RhB-exchanged LTA zeolite, (0.02% wt RhB content) | n.a. | n.a. | n. a | n.a | n.a. | n.a. |
| C2 | Mechanical mixture of FAUY 5.1 zeolites with RhB (4.76% wt RhB content) | ✓ | ✓ | ✓ | ✓ | ✓ | ✓ |
| C3 | FAUY 5.1 zeolites ion-exchanged with alternative marker, (0.2-0.5% wt NR content) | ✗ | ✓ | ✓ | ✓ | ✓ | ✓ |
| C4 | FAUY 5.1 zeolites ion-exchanged with alternative marker, (0.2-0.5% wt FITC content) | ✓ | ✓ | ✓ | ✓ | ✓ | ✓ |

Solubilization of the sample's marker in selected solvent (✗ = dye not released;
✓ = dye released). Tested both at RT and after 10 min at 50° C.; observation after 24 h.

TABLE 3

Release of the sample's dye in selected solvent.

| Ref. | Sample | released dye content in different solvents (ppmw) | | | | | |
|------|--------|------|---------|------|-----|------------|-----|
| | | $H_2O$ | acetone | DMSO | THF | Chloro-form | DCM |
| R1 | RhB_control | 66.87 | 34.41 | 46.41 | 41.19 | 33.84 | 49.62 |
| S2 | RhB-exchanged FAUY 5.1 zeolites, (0.24% wt RhB content) | <D.L. | <D.L. | <D.L. | <D.L. | <D.L. | <D.L. |
| S3 | RhB-exchanged FAUY 5.1 zeolites (0.5% wt RhB content) | <D.L. | <D.L. | <D.L. | <D.L. | <D.L. | <D.L. |
| S4 | RhB-exchanged FAUY 5.1 zeolites (0.45% wt RhB content) | <D.L. | <D.L. | <D.L. | <D.L. | <D.L. | <D.L |
| S5 | RhB-exchanged MOR 13 zeolites (0.63% wt RhB content) | <D.L. | <D.L. | <D.L. | <D.L. | <D.L. | <D.L |
| S6 | RhB-exchanged FAUY 5.1 zeolites with SAES antimicrobial silane (0.2-0.5% wt RhB content) | <D.L. | <D.L. | <D.L. | <D.L. | <D.L. | <D.L. |
| C1 | RhB-exchanged LTA zeolite. (0.02% wt RhB content) | n.a. | n.a. | n.a | n.a | n.a. | n.a. |
| C2 | Mechanical mixture of FAUY 5.1 zeolites with RhB (4.76% wt RhB content) | 70.50 | 11.91 | 2.67 | 6.98 | 10.22 | 11.98 |
| C3 | FAUY 5.1 zeolites ion-exchanged with alternative marker, (0.2-0.5% wt NR content) | N.A. for solubility limitation | 1.51 | 1.40 | 2.32 | <D.L. | 1.10 |
| C4 | FAUY 5.1 zeolites ion-exchanged with alternative marker, (0.2-0.5% wt FITC content) | 107.29 | N.A. for solubility limitation | 0.58 | N.A. for solubility limitation | N.A. for solubility limitation | 4.97 |

In order to confirm the increased stability of the marker prepared according to the present invention, samples C2 and S2 were further exposed to a heating treatment simulating a polymer process characterized by a fast ramp at 250° C. (50° C./min) and 5 min isotherm, in a Thermal Gravimetric Mass Spectrometry (TG-MS) instrument to identify traces of organic masses coming from Rhodamine B decomposition. As reported in graphic 1, when sample C2 was submitted to the above-described treatment, some organic masses were clearly identified, while for sample S2 the organic masses remain at zero level for all the time.

Contact Angle Test

Contact angle measurement is a technique used to determine the wetting properties of a liquid droplet on a solid surface. The contact angle is the angle formed between the tangent line at the droplet's three-phase contact line and the solid surface.

Initially, a solid substrate of interest is prepared to measure the wetting behavior. In this case, the substrate is a zeolite powder pill. Then, a small droplet of the liquid under investigation is carefully placed onto the solid surface using a syringe, micropipette, or other precise dispensing methods.

Finally, a high-resolution camera captures an image of the droplet on the solid surface from a suitable angle. Compared to standard protocols, for zeolite pills the acquisition must be very rapid, in less than 1 s. The acquired image is then processed using a specific software to analyze the droplet's shape and determine the contact angle.

If water is used as liquid probe, the sample is labeled as hydrophilic (polar surface, strong interaction with H2O) when the contact angle is <90°, while it is labeled as hydrophobic when the result is >90°.

Normal zeolite surface is hydrophilic, while, when the powder surface is functionalized with organic molecules, it can become hydrophobic.

The contact angle analysis has been made for sample S2 and counterexample C5 and the relative results reported in Table 4 proves that only according to the procedure of the present invention it is possible to have the Rhodamine in the pores of the zeolite, while, following the procedure known in the art the Rhodamine is bound on the external surface.

As a consequence, the zeolites herein disclosed containing the Rhodamine inside the pore are easier to integrate in a further matrix/composition, contrary to a hydrophobic zeolite such as C5, and, in addition to that, said zeolites are characterized by the possibility to have further interactions or functionalization on the surface.

TABLE 4

| Contact Angle values | | |
|------|--------|------|
| Ref. | Sample | Contact Angle $H_2O$ (°) |
| S2 | FAU5.1__RhB__13 | 16.5 ± 1.6 |
| C5 | FAUS.1__APTES-RhB | 99.7 ± 3.8 |

Preparation Method to Disperse the Dye-Exchanged Zeolite Marker in a Polymeric Matrix to Obtain an Optically Active Composition.

Several methods can be used for the preparation of polymer/zeolites composites, e.g., in situ polymerization, polymer dissolution and mixing, or melt-blending.

The preparation through in-situ polymerization is based on a first step related to the formulation of the polymer precursors and then to the introduction of the dye by using an efficient technique to obtain a fine dispersion. After obtaining a homogeneous dispersion, the liquid formulation is applied on a support where the polymerization process is promoted through the initiator activation. Different activation fields can be adopted, according to the initiator characteristics and the formulation chemical composition. Typical approaches are based on thermal processing or UV irradiation.

The solution mixing method involves four steps: solubilization of the polymer matrix in a suitable solvent at room temperature or elevated temperature, dispersion of zeolites in the solvent, mixing of the two solutions by mechanical stirring or tip/bath sonication and finally precipitation or casting of the mixture, obtaining a film after evaporation of the solvent.

Melt blending is a commonly used technique to fabricate thermoplastic/zeolites composites. It uses a high temperature and a high shear force to disperse the zeolites and is compatible with industrial processes. Depending on the desired final morphology/shape of the composites, the bulk materials can be processed by different post-extrusion techniques such as filming, injection moulding, compression moulding, melt-spinning.

Below different examples are reported for different preparation method according to the present invention:

| Example | Preparation method |
| --- | --- |
| AC 1-5 | In-situ polymerization |
| AC 6-14 | polymer dissolution and mixing |
| AC 15-18 | melt-blending |

Sample AC 1. A film of active composition was prepared by mixing 1.5 grams of polyethylene glycol dimethacrylate (PEGDMA) with 0.07 grams of ESACURE ONE from IGM resins (difunctional oligomeric alpha hydroxy ketone) as free-radical generating photoinitiator. After complete dissolution of the photoinitiator, 0.015 g of rhodamine-zeolites sample S2 was added to the formulation at room temperature and mechanical mixing was adopted for 30 min. The obtained formulation was spread out by means of a doctor blade with a thickness of 50 microns on a glass substrate and the polymerization process was promoted by using a UV lamp with an irradiance of 100 mW/cm$^2$ focus at 365 nm for 15 s (radiation dose of 1.5 J/cm$^2$). The polymerization process was performed in a glove box environment under an inert gas flux. Reference PEGDMA (UV cured) film without marker was also prepared adopting the same experimental protocol.

Sample AC 2. A film of active composition was prepared by mixing 1.5 grams of polyethylene glycol dimethacrylate with 0.07 grams of azobisisobutyronitrile (AIBN) from Sigma Aldrich as free-radical generating thermal initiator. After complete dissolution of the initiator, 0.015 g of rhodamine-zeolites sample S2 was added to the formulation at room temperature and mechanical mixing was adopted for 30 min. The obtained formulation was spread out by means of a doctor blade with a thickness of 50 microns on a glass substrate and the polymerization process was promoted by heating the sample at 80° C. for 30 minutes. The polymerization process was performed in a glove box environment under an inert gas flux.

Reference PEGDMA (thermally cured) film without marker was also prepared adopting the same experimental protocol.

Sample AC 3. A film of active composition was prepared by mixing 0.9 grams of Epikote™ 862 from Hexion (bisphenol F resin) with 0.15 grams Epon 8111 from Hexion (epoxy acrylate resin) and 0.38 grams of Epikote™ 03161 (rubber modified bisphenol A resin). The obtained formulation was vigorously stirred by mechanical mixing for 1 hour in order to obtain a homogeneous solution. Then 0.08 grams of yriaryl sulfonium hexafluoroantimonate salt as cationic initiator was added and dissolved through mechanical stirring for 30 min. After complete dissolution of the initiator. 0.015 g of rhodamine-zeolites sample S2 was added to the formulation at room temperature and mechanical mixing was adopted for additional 30 min. The obtained formulation was spread out by means of a doctor blade with a thickness of 50 microns on a glass substrate and the polymerization process was promoted by applying UV treatment with an irradiance of 100 mW/cm$^2$ for 120 s with $\lambda$=365 nm.

Reference diglycidyl ether of bisphenol F (DGEBF) based film without marker was also prepared adopting the same experimental protocol.

Sample AC 4. A film of active composition was prepared by mixing 1.35 grams of Sylgard™ 184 part A by DOW (polydimethylsiloxane, PDMS) with 0.15 grams of 184 part B (dimethyl, methylhydrogen siloxane copolymer) by DOW as crosslinking agent for 10 min. Then, 0.015 g of rhodamine-zeolites sample S2 was added to the formulation at room temperature and mechanical mixing was adopted for additional 10 min. After obtaining a homogenous dispersion, a de-airing process under vacuum is adopted for 15 min. The obtained formulation was spread out by means of a doctor blade with a thickness of 50 microns on a glass substrate and the polymerization process was promoted by heating the sample at 100° C. for 30 minutes.

Reference PDMS film without marker was also prepared adopting the same experimental protocol.

Sample AC 5. A film of active composition was prepared by mixing 1.45 grams of COMPOST LAM ADH (aliphatic polyisocyanate based polyurethane, PU) by SunChemical with 0.05 grams of alcohol dehydrogenases catalyst. Then 0.015 grams of rhodamine-zeolites sample S2 were added at room temperature and the dispersion was stirred by mechanical mixing for 15 min. The obtained formulation was spread out by means of a doctor blade with a thickness of 50 microns on a glass substrate and the crosslinking reaction was promoted at room temperature.

Reference PU film without marker was also prepared adopting the same experimental protocol.

Sample AC 6. 1.5 g of Low Density Polyethylene (LDPE), grade LUPOLEN® 2420 by LyondellBasell, was dissolved in 8.5 g of toluene at 110° C., boiling temperature. After polymer dissolution, 0.015 g of rhodamine-zeolites sample S2 was added to the polymeric solution at room temperature and the dispersion was mixed 30 min by a bath sonication at room temperature and vigorously stirred by mechanical mixing for 1 hour.

The obtained formulation was spread out by means of a doctor blade with a thickness of 50 microns on a Teflon foil and the solvent evaporation was promoted at 50° C. A composite films containing 1% wt of marker in polymer matrix was obtained. Reference LDPE film without marker was also prepared adopting the same experimental protocol.

Sample AC 7. 1.5 g of atactic polystyrene (PS), grade EDISTIR® N1910 by Versalis (ENI), was dissolved in 8.5 g of toluene at 110° C. boiling temperature. After polymer dissolution, 0.015 g of rhodamine-zeolites sample S2 was added to the polymeric solution at room temperature and the dispersion was mixed 30 min by a bath sonication at room temperature and vigorously stirred by mechanical mixing for 1 hour. The obtained formulation was spread out by means of a doctor blade with a thickness of 50 microns on a Teflon foil and the solvent evaporation was promoted at 50° C. A composite films containing 1% wt of marker in polymer matrix was obtained. Reference PS film without marker was also prepared adopting the same experimental protocol.

Sample AC 8. 1.0 g of polylactic acid (PLA) by Good-Fellow (MFR=8), was dissolved in 9.0 g of chloroform at 61° C. boiling temperature. After polymer dissolution, 0.01 g of rhodamine-zeolites sample S2 was added to the polymeric solution at room temperature and the dispersion was mixed 30 min by a bath sonication at room temperature and vigorously stirred by mechanical mixing for 1 hour. The obtained formulation was spread out by means of a doctor blade with a thickness of 50 microns on a Teflon foil and the solvent evaporation was promoted at 40° C. A composite films containing 1% wt of marker in polymer matrix was obtained. Reference PLA film without marker was also prepared adopting the same experimental protocol.

Sample AC 9. 1.0 g of polyhydroxy butyrate (PHB) by GoodFellow, was dissolved in 20.0 g of chloroform at 61° C., boiling temperature. After polymer dissolution, 0.03 g of rhodamine-zeolites sample S2 was added to the polymeric solution at room temperature and the dispersion was mixed 30 min by a bath sonication at room temperature and vigorously stirred by mechanical mixing for 1 hour. The obtained formulation was spread out by means of a doctor blade with a thickness of 50 microns on a Teflon foil and the solvent evaporation was promoted at 40° C. A composite films containing 3% wt of marker in polymer matrix was obtained. Reference PHB film without marker was also prepared adopting the same experimental protocol.

Sample AC 10. 1.0 g of polyhydroxy butyrate/polyhydroxyvalerate 2% (PHBV) by GoodFellow, was dissolved in 20.0 g of chloroform at 61° C., boiling temperature. After polymer dissolution. 0.03 g of rhodamine-zeolites sample S2 was added to the polymeric solution at room temperature and the dispersion was mixed 30 min by a bath sonication at room temperature and vigorously stirred by mechanical mixing for 1 hour. The obtained formulation was spread out by means of a doctor blade with a thickness of 50 microns on a Teflon foil and the solvent evaporation was promoted at 40° C. A composite film containing 3% wt of marker in polymer matrix was obtained. Reference PHBV film without marker was also prepared adopting the same experimental protocol.

Sample AC 11. 1.0 g of polyvinyl alcohol (PVOH): grade Exceval® AQ-4104 by Kuraray, was dissolved in 9.0 g of distilled water at 100° C., boiling temperature. After polymer dissolution. 0.01 g of rhodamine-zeolites sample S2 was added to the polymeric solution at room temperature and the dispersion was mixed 30 min by a bath sonication at room temperature and vigorously stirred by mechanical mixing for 1 hour. The obtained formulation was spread out by means of a doctor blade with a thickness of 50 microns on a glass substrate and water evaporation was promoted at 50° C. A composite films containing 1% wt of marker in polymer matrix was obtained. Reference PVOH film without marker was also prepared adopting the same experimental protocol.

Sample AC 12. 1.0 g of hydroxypropylated starch ether (STARCH): grade SOLCOAT P85 by SOLAM, was dissolved in 9.0 g of distilled water at 100° C., boiling temperature. After polymer dissolution, 0.01 g of rhodamine-zeolites sample S2 was added to the polymeric solution at room temperature and the dispersion was mixed 30 min by a bath sonication at room temperature and vigorously stirred by mechanical mixing for 1 hour. The obtained formulation was spread out by means of a doctor blade with a thickness of 50 microns on a glass substrate and water evaporation was promoted at 40° C. A composite films containing 1% wt of marker in polymer matrix was obtained. Reference STARCH film without marker was also prepared adopting the same experimental protocol.

Example AC 13 (blend 1). 0.7 g of polylactic acid (PLA) by GoodFellow (MFR=8) and 0.3 g of polyhydroxy butyrate/polyhydroxyvalerate 2% (PHBV) by GoodFellow were dissolved in 18.0 g of chloroform at 61° C., boiling temperature. After polymer dissolution, 0.05 g of rhodamine-zeolites sample S2 was added to the polymeric solution at room temperature and the dispersion was mixed 30 min by a bath sonication at room temperature and vigorously stirred by mechanical mixing for 1 hour. After solution casting, composite films containing 3% wt of marker in polymer matrix was obtained. Reference PLA/PHBV film without marker was also prepared adopting the same experimental protocol.

Example AC 14 (blend 2). 0.7 g of polyvinyl alcohol (PVOH): grade Exceval® AQ-4104 by Kuraray and 0.3 g of hydroxypropylated starch ether (STARCH): grade SOLCOAT P85 by SOLAM were dissolved in 9.0 g of distilled water at 90° C. under vigorous stirring. After complete dissolution of the polymers. 0.01 g of rhodamine-zeolites sample S2 were added to the polymeric solution at room temperature (RT) and the dispersion was mixed 30 min by a bath sonication at RT and vigorously stirred by mechanical mixing for 1 hour at RT. The obtained formulation was spread out by means of a doctor blade with a thickness of 50 microns on a glass substrate and water evaporation was promoted at 50° C. Reference PVOH/starch film without marker was also prepared adopting the same experimental protocol.

Example AC 15 49 g of polyethylene low density powders≤400 micron purchased from Alfa Aesar were compounded via melt-blending with 1 g of rhodamine-zeolites (sample S2) using a Lab Two Roll Open Mixing Mill (Battaggion) for 5 minutes. The conditions of rolling process were: Temperature Front roller=130° C.; Temperature Back roller=80° C.; Rolling speed=33 rpm. The resulting compounded material was compression moulded using a laboratory press (Gibitre Instruments) at P=230 bar and T=175° C. for 5 minutes obtaining a sheet (thickness≈200 μm) with 2% wt of marker. Reference polyethylene sheet without marker was also produced following the same experimental protocol.

Example AC 16 49 g of polylactic acid (grade Nature-Works 2003D) was compounded via melt-blending with 1 g of rhodamine-zeolites (sample S2) using a Lab Two Roll Open Mixing Mill (Battaggion) for 5 minutes. The conditions of rolling process were: Temperature Front roller=155° C.; Temperature Back roller=125° C.; Rolling speed=33 rpm. The resulting compounded material was compression moulded using a laboratory press (Gibitre Instruments) at P=230 bar and T=190° C. for 5 minutes obtaining a sheet (thickness≈200 μm) with 2% wt of marker. Reference polylactic acid sheet without marker was also produced following the same experimental protocol.

Example AC 17 48.5 g of polyhydroxybutyrate/polyhydroxyvalerate 2% (PHBV) by GoodFellow was compounded via melt-blending with 1.5 g of rhodamine-zeolites (sample S2) using a Lab Two Roll Open Mixing Mill (Battaggion) for 5 minutes. The conditions of rolling process were: Temperature Front roller=170° C.; Temperature Back roller=145° C.; Rolling speed=33 rpm. The resulting compounded material was compression moulded using a laboratory press (Gibitre Instruments) at P=230 bar and T=190° C. for 5 minutes obtaining a sheet (thickness≈200 μm) with 3% wt of marker. Reference PHBV sheet without marker was also produced following the same experimental protocol.

Example AC 18

98 g of Acrylonitrile butadiene styrene ABS (grade Terluran® GP-22 produced by INEOS STYROLUTION) was compounded via melt-blending with 2 g of rhodamine-zeolites (sample S5) using a Lab Bench Top Two-Roll Mill (LabTech Engineering) for 5 minutes. The conditions of rolling process were: Temperature Front roller=175° C.; Temperature Back roller=170° C.; Rolling speed=10 rpm. The resulting compounded material containing 2% wt of marker S5 was shaped in sheets (thickness 500 μm). Reference ABS sheet without marker was produced following the same preparation protocol.

Prepared examples are summarized in the following Table 4:

| Sample name | Polymer matrix | | Rhodamine-zeolites | | Solvent | |
| | Type | g | Sam-ple | % wt-polymer matrix | Type | g |
| --- | --- | --- | --- | --- | --- | --- |
| Example AC1-ref | PEGDMA | 1.5 | — | 0 | — | — |
| Example AC1 | PEGDMA | 1.5 | S2 | 1 | — | — |
| Example AC2-ref | PEGDMA | 1.5 | — | 0 | — | — |
| Example AC2 | PEGDMA | 1.5 | S2 | 1 | — | — |
| Example AC3-ref | DGEBF | 1.5 | — | 0 | — | — |
| Example AC3 | DGEBF | 1.5 | S2 | 1 | — | — |
| Example AC4-ref | PDMS | 1.5 | — | 0 | — | — |
| Example AC4 | PDMS | 1.5 | S2 | 1 | — | — |
| Example AC5-ref | PU | 1.5 | — | 0 | — | — |
| Example AC5 | PU | 1.5 | S2 | 1 | — | — |
| Example AC6-ref | LDPE | 1.5 | — | 0 | Toluene | 8.5 |
| Example AC6 | LDPE | 1.5 | S2 | 1 | Toluene | 8.5 |
| Example AC7-ref | PS | 1.5 | — | 0 | Toluene | 8.5 |
| Example AC7 | PS | 1.5 | S2 | 1 | Toluene | 8.5 |
| Example AC8-ref | PLA | 1.0 | — | 0 | Chloroform | 9 |
| Example AC8 | PLA | 1.0 | S2 | 1 | Chloroform | 9 |
| Example AC9-ref | PHB | 1.0 | — | 0 | Chloroform | 20 |
| Example AC9 | PHB | 1.0 | S2 | 3 | Chloroform | 20 |
| Example AC10-ref | PHBV | 1.0 | — | 0 | Chloroform | 20 |
| Example AC10 | PHBV | 1.0 | S2 | 3 | Chloroform | 20 |
| Example AC11-ref | PVOH | 1.0 | — | 0 | Water | 9 |
| Example AC11 | PVOH | 1 | S2 | 1 | Water | 9 |
| Example AC12-ref | STARCH | 1 | — | 0 | Water | 9 |
| Example AC12 | STARCH | 1 | S2 | 1 | Water | 9 |
| Example AC13 (blend 1)-ref | PLA PHBV | 0.7 0.3 | — | 0 | Chloroform | 18 |
| Example AC13 (blend 1) | PLA PHBV | 0.7 0.3 | S2 | 3 | Chloroform | 18 |
| Example AC14 (blend 2)-ref | PVOH STARCH | 0.7 0.3 | — | 0 | Water | 9 |
| Example AC14 (blend 2) | PVOH STARCH | 0.7 0.3 | S2 | 1 | Water | 9 |
| Example AC15-ref | LDPE | 50 | — | 0 | — | — |
| Example AC15 | LDPE | 49 | S2 | 2 | — | — |
| Example AC16-ref | PLA | 50 | — | 0 | — | — |
| Example AC16 | PLA | 49 | S2 | 2 | — | — |
| Example AC17-ref | PHBV | 50 | — | 0 | — | — |
| Example AC17 | PHBV | 48.5 | S2 | 3 | — | — |
| Example AC18-ref | ABS | 100 | — | — | — | — |
| Example AC18 | ABS | 98 | S5 | 2 | — | — |

Markers and Matrix Optical Characterization.

Equipment description. For measurement was used a Horiba FluoroMax® Plus spectrofluorometer. A continuous light source $P_o$=150 W ozone free xenon arc lamp focused on the entrance slit of the excitation monochromator was adopted. The instrument was based on two Czerny-Turner monochromators dispersing the incident light by means of its reflection grating. Optical spectra were obtained by rotating the gratings and recording the intensity values at each wavelength. The entrance and exit ports of each monochromator included continuously adjustable slits to control the spectral resolution and the intensity of the fluorescence signal recorded by a photomultiplier tube. Solid sample holder mounted on an adjustable goniometer was used to test polymer products in form of films or plaques added with the marker. Set up of the sample with a 60° angle between incident and specularly reflected beam was used, preventing the excitation beam from entering the emission slit, so avoiding interference of stray-light. FluorEssence™ analysis management software was used to acquire and process data.

Description of Samples Characterization Protocol.

Marker excitation and emission peaks in polymer matrices were compared with reference sample (polymer matrix without marker) and pure marker excitation and emission peaks in order to detect dye presence inside polymeric matrices. By considering dye fluorescence, samples performances were studied as a ratio between fluorescence intensity I of active composition and the fluorescence intensity $I_0$ of the pure polymer matrix without dye, submitted to excitation at 540 nm. According to the adopted protocol, marker presence was considered detectable when a value larger than 2 was determined for $I/I_0$ ratio. In the following table 5 are reported recorded values for all tested samples.

TABLE 5

| Polymer matrix | Detected emission peak (nm) | Emission intensity I at peak (cps/μ A) | Pure matrix $I_0$ intensity (cps/μ A) | $I/I_0$ ratio |
| --- | --- | --- | --- | --- |
| Example AC1 | 580 | $1.62 \times 10^5$ | $0.11 \times 10^5$ | >2 |
| Example AC2 | 570 | $0.65 \times 10^5$ | $0.11 \times 10^5$ | >2 |
| Example AC3 | 577 | $8.44 \times 10^5$ | $3.00 \times 10^5$ | >2 |
| Example AC4 | 580 | $1.12 \times 10^5$ | $0.033 \times 10^5$ | >2 |
| Example AC5 | 570 | $1.73 \times 10^5$ | $0.22 \times 10^5$ | >2 |
| Example AC6 | 581 | $0.29 \times 10^5$ | $0.057 \times 10^5$ | >2 |
| Example AC7 | 580 | $0.55 \times 10^5$ | $0.041 \times 10^5$ | >2 |
| Example AC8 | 574 | $1.75 \times 10^5$ | $0.26 \times 10^5$ | >2 |
| Example AC9 | 573 | $0.22 \times 10^5$ | $0.051 \times 10^5$ | >2 |
| Example AC10 | 573 | $1.10 \times 10^5$ | $0.32 \times 10^5$ | >2 |
| Example AC11 | 569 | $1.95 \times 10^5$ | $0.16 \times 10^5$ | >2 |
| Example AC12 | 574 | $1.67 \times 10^5$ | $0.026 \times 10^5$ | >2 |
| Example AC13 | 572 | $0.77 \times 10^5$ | $0.068 \times 10^5$ | >2 |
| Example AC14 | 569 | $0.65 \times 10^5$ | $0.014 \times 10^5$ | >2 |
| Example AC15 | 567 | $2.57 \times 10^5$ | $0.24 \times 10^5$ | >2 |
| Example AC16 | 577 | $4.42 \times 10^5$ | $0.40 \times 10^5$ | >2 |
| Example AC17 | 577 | $3.23 \times 10^5$ | $0.19 \times 10^5$ | >2 |
| Example AC18 | 576 | $4.91 \times 10^5$ | $1.46 \times 10^5$ | >2 |

The invention claimed is:

1. A dye-exchanged zeolite marker comprising a zeolite and a dye, wherein:
   a) the zeolite is in the form of a powder with an average particle size characterized by a $X_{90}$ value comprised between 0.5 and 50 μm and a pore size comprised between 4 Å and 12 Å,
   b) the dye is an organic cationic molecule selected from the group consisting of Rhodamine B, Tetramethyl rhodamine isothiocyanate-Dextran, Rhodamine 6G, Rhodamine B isothiocyanate, and Rhodamine 19 perchlorate, and
   c) the amount of the dye is comprised between 0.05% wt and 1% wt with respect to the zeolite weight.

2. The dye-exchanged zeolite marker according to claim 1, wherein the zeolite is a Faujasite zeolite (FAU) or a Mordenite zeolite (MOR).

3. The dye-exchanged zeolite marker according to claim 1, wherein the amount of dye is comprised between 0.1% wt and 0.5% wt with respect to the zeolite weight.

4. The dye-exchanged zeolite marker according to claim 1, wherein the average particle size is characterized by a $X_{90}$ value comprised between 0.5 and 20 μm.

5. The dye-exchanged zeolite marker according to claim 1, wherein the zeolite comprises a surface modified or functionalized with alkoxysilane derivatives.

6. The dye-exchanged zeolite marker according to claim 5, wherein the alkoxysilane derivatives moiety is present in an amount comprised between 1 and 40% wt with respect to the zeolite weight.

7. The dye-exchanged zeolite marker according to claim 1, obtained via a cation exchange reaction between at least one positive ion of the zeolite and at least one positive ion of the dye.

8. A composition comprising the exchanged zeolite marker according to claim 1, dispersed in a polymeric matrix, wherein the polymeric matrix is selected among polyethylene (PE), polypropylene (PP), polystyrene (PS), polyethylene terephthalate (PET), acrylonitrile butadiene styrene (ABS) and their copolymers and functionalized polymers, acrylics, acrylics-styrene, acrylics-vinyl and alkyl copolymer, urethane-acrylics, urethanes, polyurethanes, epoxies, siloxanes and polysiloxanes, phenolic resin, poly [ethene-co-(vinyl alcohol)] (EVOH), poly(vinyl alcohol) (PVAL), poly(lactic-co-glycolic acid) (PLGA), polyethylene glycol (PEG), poly(vinyl acetate) (PVAC), waterborne or water reducible latex, polylactic acid (PLA), aliphatic or aromatic co-polyesters and natural polymers.

9. The composition according to claim 8, wherein the dye-exchanged zeolite marker is present in an amount comprised between 0.1 and 10% by weight with respect to the polymeric matrix.

10. The composition according to claim 8, further comprising a filler in an amount between 0.1 and 20% by weight with respect to the polymeric matrix.

11. The composition according to claim 10, wherein the filler is selected in a group consisting of hydrotalcites, zirconium phosphate, porphyrins, graphene and other two-dimensional crystals, zeolites, halloysites, graphene oxide, metal organic frameworks (MOFs), organic beads, cellulose and antioxidant capsules, self-assembled proteins, ester terminated polyamide, tertiary amide terminated polyamide, polyether polyamide, polyalkyleneoxy terminated polyamide, and mixtures thereof.

12. The composition according to claim 8, wherein the polymeric matrix is processed in a form of a coating, a film, a lacquer, a frame, a three-dimensional element, a pellet or a sheet.

\* \* \* \* \*